Figure 1:
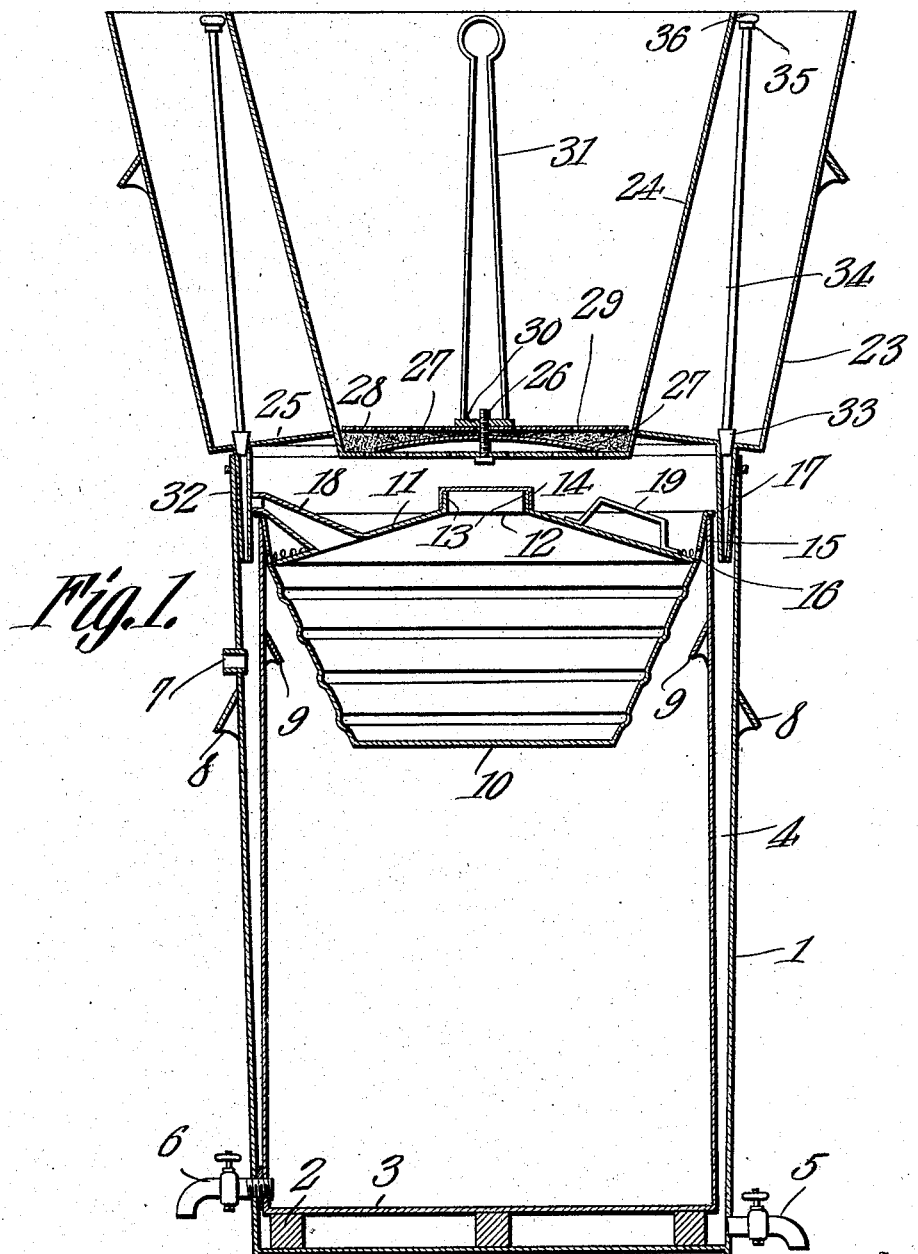

J. E. JOHNSTON.
APPARATUS FOR COOLING AND PRESERVING MILK.
APPLICATION FILED DEC. 5, 1908.

918,862.

Patented Apr. 20, 1909.
2 SHEETS—SHEET 1.

Witnesses

Inventor
James E. Johnston.
By C. A. Snow & Co.
Attorneys

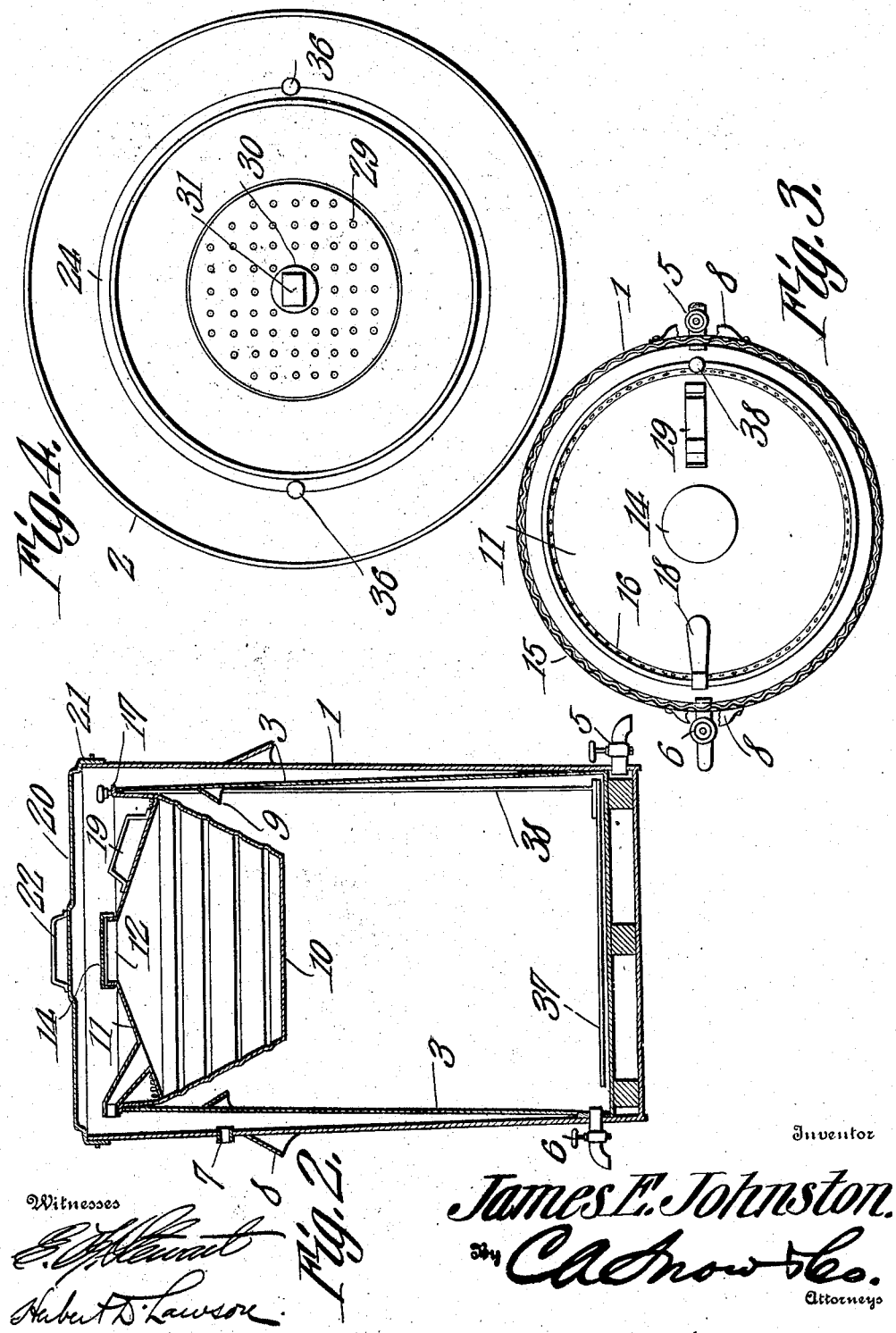

UNITED STATES PATENT OFFICE.

JAMES E. JOHNSTON, OF OBERLIN, OHIO.

APPARATUS FOR COOLING AND PRESERVING MILK.

No. 918,862.  Specification of Letters Patent.  Patented April 20, 1909.

Application filed December 5, 1908. Serial No. 466,145.

*To all whom it may concern:*

Be it known that I, JAMES E. JOHNSTON, a citizen of the United States, residing at Oberlin, in the county of Lorain and State of Ohio, have invented a new and useful Apparatus for Cooling and Preserving Milk, of which the following is a specification.

This invention relates to apparatus for cooling milk and for maintaining it at a low temperature while being placed in delivering receptacles and also while contained within said receptacles.

One of the objects of the invention is to provide a receptacle-filling device constituting aerating, cooling and straining means and designed to be used in connection with delivering receptacles, said device being so constructed as to be readily positioned upon the delivering receptacles and capable of directing milk and a cooling liquid, such as ice-water, simultaneously into the proper compartments within the delivering receptacles.

Another object is to provide a delivering receptacle having a water-jacket and an interior cooling member having an outlet opening into the jacket.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a central vertical section through the complete apparatus. Fig. 2 is a vertical section through the delivering receptacle with its closure in position thereon. Fig. 3 is a plan view of the delivering receptacle with the closure removed. Fig. 4 is a plan view of the filling device.

Referring to the figures by characters of reference, 1 designates the outer casing or jacket of the delivering receptacle, said jacket being slightly tapered toward its lower end and having spacing blocks 2 upon the bottom thereof, which support the interior casing or receptacle 3. Said interior receptacle is preferably cylindrical in form, so that an annular compartment 4 is formed between the two casings 1 and 3, said compartment gradually diminishing in thickness toward its lower end and opening into the space between the bottoms of the two casings, said space being provided with a valved outlet 5. This outlet constitutes a drain for the liquid contents of the compartment 4. The inner casing 3 does not extend the full height of the outer casing or jacket 1, but terminates a short distance below the upper edge thereof. A faucet 6 may be connected to the lower portion of the casing 3, and extends through the outer casing or jacket 1, said faucet constituting means whereby the contents of the inner receptacle can be readily drawn. An overflow opening 7 is preferably formed within the jacket 1 at a point below the upper edge of the inner casing 3 and suitable handles 8 may be formed upon the outer face of the outer jacket 1 for the purpose of facilitating the manipulation of the receptacle. Handles 9 are also formed upon the inner face of the inner casing 3 adjacent the upper edge thereof, so that said casing can be readily removed from the jacket 1 after the faucet 6 has been disengaged therefrom. This faucet is preferably attached to the inner casing 3 by screwing it thereinto in the ordinary manner, and is not used unless the receptacle is employed for peddling milk.

Detachably mounted within the upper portion of the inner casing 3 is a receptacle 10, preferably in the form of an inverted cone frustum, and having a substantially conical top portion 11 formed at its apex with an inlet 12 surrounded by a thimble 13, designed to be engaged by a cap 14. An inclined flange 15 extends upwardly from the periphery of the receptacle 10, and is provided close to the top 11 of said receptacle with a series of apertures 16 constituting outlets for liquid which may be deposited upon the top 11. An outstanding rim 17 is formed upon the upper edge of the flange 15 and is designed to rest upon the upper edge of the inner casing 3, so as to support the receptacle 10 within said casing. An outlet spout 18 extends from the top 11 and is designed to lap the upper edge of the inner casing 3, so that any overflow from the receptacle 10 will be directed into the compartment 4. A handle 19 is located upon the top 11 so as to permit the receptacle 10 to be tilted whenever desired, for the purpose of causing the liquid contents thereof to flow through the spout 18 and into the compartment 4.

As shown in Fig. 2, the delivering receptacle may be provided with a cover 20, having a flange 21 designed to fit snugly around the outer casing or jacket 1, there being a handle 22 upon the cover, and whereby it can be conveniently manipulated.

The device hereinbefore described is particularly designed for use in conveying or peddling milk, and, by filling the receptacle 10 with ice or cold water and the compartment 4 with cold water, the milk contained within the inner casing 3 can be kept cool for a long time. As the ice within the receptacle 10 melts the said receptacle can be tilted so as to direct the water therefrom and through the spout 18 into the compartment 4. The milk may be drawn from the inner receptacle through the faucet 6, and, when it is desired to remove the water from compartment 4, it is merely necessary to open the valved outlet 5.

In order to fill the receptacle herein described it is deemed desirable to use a feed device of special construction, and which has been shown in Fig. 1 in connection with the delivering receptacle hereinbefore described. This device consists preferably of an outer casing 23 within which is located an inverted frusto-conical receptacle 24, the bottom, 25, of which is provided with a number of apertures and projects through the bottom of the casing 23. A screw threaded stem 26 extends upwardly from the bottom 25 and slidably mounted thereon is a spring 27 designed to support a fibrous filtering material 28 formed of raw cotton or the like, said material being held firmly upon the spring 27 by means of a perforated follower 29. A nut 30 is mounted on the stem 26 and is provided with an elongated finger-piece 31 extending to the top of the receptacle 24 whereby the nut 30 can be rotated without the necessity of inserting the fingers of the user into the liquid contents of said receptacle. By turning the nut 30 the filtering material 28 can be compressed more or less upon the spring 27.

Outlet tubes 32 extend downwardly from the bottom of the outer casing 23, and the distance between these tubes is such that when the feed device is placed upon the top of the delivering receptacle as shown in Fig. 1, they, the tubes, will project into the upper portion of the compartment 4. The tubes are normally closed at their upper ends by means of plugs 33 carried by the lower portions of rods 34 which are slidably mounted in suitable guides 35 carried by the upper portion of the receptacle 24. Each rod 34 has a head 36 whereby it can be conveniently grasped and elevated for the purpose of removing the plug 33 from the tube 32 thereunder, thus permitting the contents of the outer casing 23 to flow through the tube and into the compartment 4 thereunder.

The filling device is designed to be used at the dairy or wherever the delivering receptacles are to be filled. Said device is placed upon the delivering receptacle after the cover 20 has been removed, and the tubes 32 will therefore project into the compartment 4, although normally closed at their upper ends by the plugs 33. The space within the casing 23 and surrounding the inner receptacle 24 is filled with cold water after which the milk to be strained and supplied to the delivering receptacle is placed within the inner receptacle 24. The milk will filter slowly through the material 28 and will fall onto the conical top 11 of the ice receptacle 10, thus becoming thoroughly aerated. The milk will flow downwardly on to this top and escape through the openings 16 into the receptacle 3, this filling operation obviously quickly cooling the milk. After the receptacle 3 has been filled, or, during the filling operation, the plugs 33 are raised from their seats so as to permit the water contained within the casing 23 to flow downwardly through the tubes 32 and into the compartment 4. After the delivering receptacle has been filled the cover 20 may be placed thereon and the milk contained within the receptacle will thus be maintained at a low temperature for a considerable period. Whenever desired the operator or user can tilt the receptacle 10 for the purpose of directing the ice-water from said receptacle and through the spout 18 to the compartment 4. Water can be drawn from the compartment 4 through the valved outlet 5 whenever desired. By providing the spring support 27 for the filtering material 28 said material will not clog the openings in the bottom 25, and, by adjusting the nut 30 the filtering material can be more or less compressed, so as to increase or diminish the filtering action thereof.

As shown in Fig. 2, the receptacle, when used for peddling, can be provided with an agitator 37 of any suitable construction and provided with a stem 38 extending close to the top of the jacket 1, said agitator being utilized for the purpose of thoroughly mixing the milk and cream before drawing the same from the inner receptacle 3 through the faucet 6.

Obviously, various changes may be made in the construction and arrangement of the parts without departing from the spirit or sacrificing the advantages of the invention.

What is claimed is:—

1. In a device of the class described a receptacle, a combined feeding and filtering device mounted thereon, a refrigerant holder within the upper portion of the receptacle and in the path of liquid discharged from the feeding device, said refrigerant holding device having a conical top, and a supporting flange extending from said top and detachably engaging the upper end of the receptacle, said flange having an outlet opening therein at its base.

2. A device of the class described comprising a receptacle, a jacket surrounding the same and forming a cooling compartment around said receptacle, means for supporting a refrigerant within the upper portion of the receptacle, said means opening into the cooling compartment, a feeding device mounted above the receptacle and disposed to direct liquid to be cooled on to the refrigerant-holding means and into the receptacle, and means for directing a cooling liquid from said feeding device and into the cooling compartment.

3. In a device of the class described a receptacle, a jacket surrounding the same and forming a cooling compartment around the receptacle, refrigerant-holding means detachably mounted within the upper end of the receptacle and having an inclined top, and means for conveying liquid from said holding means to the cooling compartment.

4. In a device of the class described a receptacle, a jacket surrounding the same and forming a cooling compartment extending around the receptacle, a refrigerant-holding device within the upper portion of the receptacle and having a conical top, a supporting flange extending from said device and detachably engaging the receptacle, said flange having outlet openings therein, and a spout for conveying liquid from the refrigerant-holding means to the cooling compartment.

5. In a device of the class described a delivering receptacle comprising inner and outer casings forming a receiving compartment and a cooling compartment, a receptacle detachably and tiltably mounted within the upper portion of the receiving compartment and supported by the inner casing, said receptacle having an inclined top, a supporting flange upon the receptacle and engaging the inner casing, said flange having outlet apertures therein, and means for directing liquid contents of the receptacle into the cooling compartment.

6. In a device of the class described a delivering receptacle comprising inner and outer casings forming a receiving compartment and a cooling compartment, a refrigerant-holding receptacle detachably and tiltably mounted within the upper portion of the receiving compartment, and means for conveying liquid contents of said receptacle to the cooling compartment when the receptacle is tilted.

7. In a device of the class described a feeding member comprising inner and outer casings, said inner casing having an apertured bottom, a yieldingly supported filtering material upon the bottom portion of the inner casing, adjustable means for compressing the filtering material.

8. In a device of the class described a combined filtering and feeding member comprising inner and outer casings forming concentric compartments, outlet tubes extending from the bottom of the outer compartment, means for controlling the discharge of liquid through said tubes, and a filter within the bottom portion of the inner compartment, said inner compartment having an apertured bottom.

9. In a device of the class described a feeding member comprising inner and outer casings, said inner casing having an apertured bottom, yieldingly supported filtering material disposed upon said bottom, adjustable means for compressing said material, and valve-controlled means for regulating the discharge of liquid from the outer casing.

10. In a device of the class described a receptacle, a jacket surrounding the same and forming a cooling compartment extending around the receptacle, a refrigerant-supporting device within the receptacle and constituting spreading means, a filtering device for directing liquid on to the spreading means and into the receptacle, and valve-controlled means for directing a cooling liquid into the cooling compartment.

11. In a device of the class described a receptacle, a jacket surrounding the same and forming a cooling compartment, a refrigerant holding device within the upper portion of the receptacle and a supporting flange extending upwardly from said device and detachably engaging the receptacle, said flange having outlet openings therein close to the top of the device.

12. In a device of the class described a receptacle, a refrigerant holding device within the upper portion of the receptacle, and a supporting flange extending upwardly from said device and detachably engaging the top of the receptacle, said flange having outlet openings therein.

In testimony that I claim the foregoing as my own, I have hereto affixed my signature in the presence of two witnesses.

JAMES E. JOHNSTON.

Witnesses:
 CHARLES A. HAMMOND,
 G. H. CARTER.